July 31, 1923.
C. M. COLE
1,463,546
LIGHT REFLECTOR
Filed Sept. 28, 1920
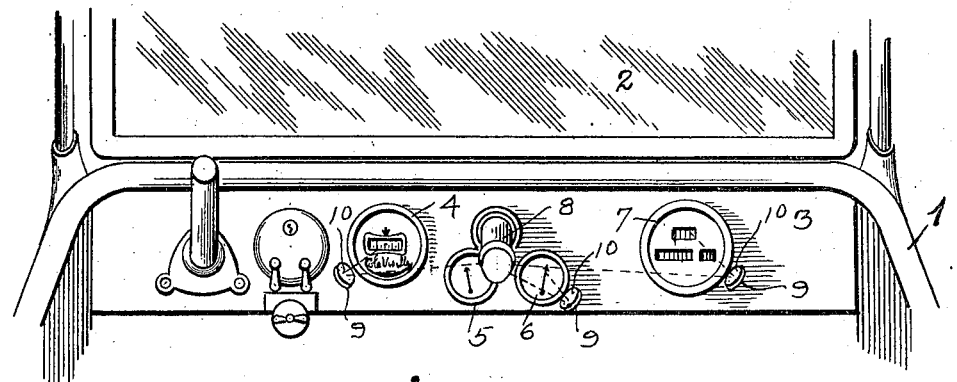
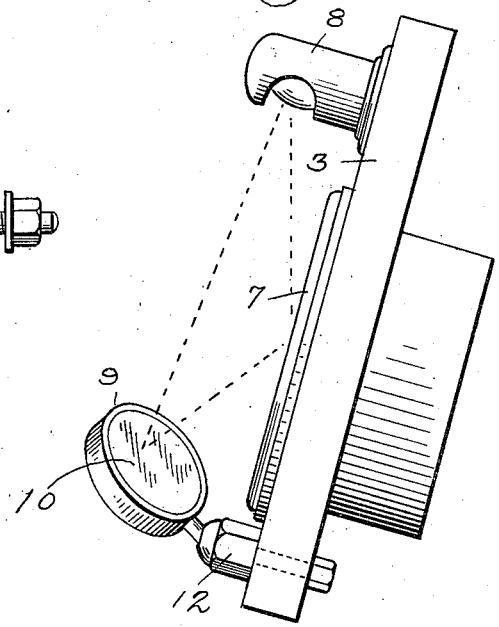
Inventor
Wilford M. Cole
By F. L. Walker
Attorney Patented July 31, 1923.

1,463,546

UNITED STATES PATENT OFFICE.

CLIFFORD M. COLE, OF LOS ANGELES, CALIFORNIA.

LIGHT REFLECTOR.

Application filed September 28, 1920. Serial No. 413,420.

*To all whom it may concern:*

Be it known that I, CLIFFORD M. COLE, a citizen of the United States, residing at Los Angeles, in the county of Los Angeles and State of California, have invented certain new and useful Improvements in Light Reflectors, of which the following is a specification.

This invention relates to illuminating devices and more particularly to means for diverting the rays of light from an ordinary cowl board or dash light of an automobile to illuminate the faces of various instruments and gages located upon the instrument or dash of the vehicle, beyond the normal range or field of illumination of such lamps.

The invention is embodied in a small, inexpensive mirror or reflective surface mounted upon the cowl board of a motor vehicle or the like, beyond the normal field of illumination of the usual dash lamp, by which a beam of light from such distant lamp may be redirected upon the face of an instrument without causing objectional glare into the eyes of an observer or the driver. Such miniature reflector may be adjustably mounted to enable its adjustment according to the position of the observer, or it may be fixedly mounted in a predetermined relation with the instrument to be illuminated.

The object of the invention is to afford a simple and cheap, but durable and efficient means for illuminating cowl board instruments distantly located from the source of illumination, or otherwise shaded.

With the above primary and other incidental objects in view as will more fully appear in the specification, the invention consists of the features of construction, the parts and combinations thereof, and the mode of operation or their equivalents, as hereinafter described and set forth in the claims.

In the accompanying drawings in which is illustrated one of several possible applications of the invention, Fig. 1 illustrates the forward portion of an automobile including the cowl board or instrument board showing the relative location of the lamp and gages or instruments to be illuminated and the relative positions of the illuminator or reflector forming the subject matter hereof. Fig. 2 is a side elevation of the instrument or cowl board, further illustrating the relative location of the reflector or illuminating device in relation with the lamp and surface to be illuminated. Fig. 3 is a detail view partly in section of the illuminator and its mounting removed from the instrument or cowl board.

Like parts are indicated by similar characters of reference throughout the several views.

Referring to the drawings, 1 is the body of an automobile of which 2 is the wind shield, and 3 the instrument or cowl board upon the dash. It is usual to locate upon the dash or cowl board, a series of gages or instruments for the information of the driver. In the present instance there has been shown a gasolene gage 4, ammeter and oil gage 5 and 6, and a speedometer 7. A small incandescent lamp usually mounted in a hood or holder 8 is usually located upon a dash or cowl board in a medial position near the upper edge of the board. The lamp is of usually small size, and projects as short distance as possible from the face of the cowl board or dash in order that it may not be in the way or afford any obstruction to entering or leaving the machine. Being located closely adjacent to the supporting board 3, the rays of light from the lamp are projected almost parallel with the surfaces or faces of the gages and instruments to be illuminated. The character of the usual lamp and mounting is such that the range or field of illumination is quite limited and some of the instruments must necessarily be located beyond the limit of the field of illumination. Those instruments or gages within the range of illumination receive their light at such an acute angle of incidence as to cause reflection and glare, which seriously interferes with the reading of the gages.

The present device is intended to collect random rays of light which would not otherwise reach the instrument, and divert such rays out of their natural course onto the faces of the instruments or gages to be read at such an angle as to afford the necessary illumination.

By means of the illuminator 9 forming the subject matter hereof, the rays of light may be diverted from their actual course to illuminate the instruments at the ends of the board or elsewhere beyond the normal range or field of illumination of the lamp. To this end the illuminator is located at a suitable point to collect the random rays of light which would not otherwise reach the instrument or gage face, and is adjusted to such angle that it will redirect the rays of light in any desired direction. While such reflectors may be permanently located in adjusted positions, it will be found of great convenience to change the angle or adjustment of the illuminant or reflector to accord with the position of the observer. For instance, a tall driver who sits upright in driving position, may require a slight adjustment of the angle of reflection, in order to avoid reflection or glare from the instrument face different from that of a short driver or one who drives in a crouching position. Likewise a passenger riding beside the driver may find it convenient to change the angle of the reflector to secure better or more uniform illumination from his point of view. To this end the illuminator or reflector herein described is provided with a universal mounting, by which it is enabled to assume various positions and angles within a wide range of adjustment. The preferred form of illuminator is illustrated in Fig. 3, wherein 10 is a reflecting surface, which may be of polished metal or a silvered glass mirror, or other like element. This reflector head 10 has been shown of circular form. However, it is obvious that rectangular or other polygonal shapes may be employed. These reflector heads are of comparatively small size, dependent of course to some extent upon the degree of illumination, and the character and amount of light to be reflected. For automobile use, as illustrated in Fig. 1, these reflector heads are approximately the size of a twenty-five cent coin, and are quite comparable with the head of a dental mirror. The reflector head 10 is provided with a stem or neck of spherical form as at 11. The spherical stem or ball connection 11 is inserted within a socket member 12 contracted upon the ball to afford a universal or ball and socket joint. There is located within the socket 12 beneath the ball 11, a resilient body 13 preferably, though not necessarily a helical spring, comprising but a few turns, which will exert a constant, but yielding pressure upon a ball 11, thereby affording sufficient frictional engagement of the spring or other resilient body with the ball, and in turn the ball with the inturned edges of the socket member, to hold the reflector head 10 in its adjusted position. The tension is sufficient to resist any tendency of the reflector to change its position under influence of vibrations, or jar of the vehicle. While for ordinary purposes a simple plano reflector will be found sufficient, for those conditions under which the reflected light is to be concentrated or transmitted a considerable distance, the reflector head 10 may be concave, or convex.

While the invention has been herein described and illustrated in its application to the cowl board or dash of motor vehicles, it is to be understood that the range of usefulness is not limited to this application alone. For instance such a luminator may be located in juxtaposition to the house numbers of residences, or in proximity to notices or signs of various types.

It is to be noted that whereas the usual type of reflector is placed behind the light and in close proximity thereto, to direct the rays in a single direction, the present reflecting device or illuminator is located at a distance from the light in such relation as to collect and divert the random or waste rays. As a further possible application, such an illuminator might be located in proximity to the usual automobile license number or tag for improving the illumination thereof at night. The light rays for the illumination of the number plate might be derived from the present tail light, and the front number plate might be illuminated from the head light, by means of such illuminator even though the number plate is located to the rear of the lamp. A reflector of this type mounted upon the front fender might be employed to direct light rays from the head light rearwardly upon a red lens in the rear of the machine in lieu of the usual tail light. The device affords the means for conserving and utilizing waste light rays, which would otherwise be lost by diverting such rays upon the surface to be illuminated. In the event that the illuminating surface is within the range or field of illumination of the lamp or source of light, this diversion of waste light thereafter will increase the degree of illumination, while in other instances it may be deflected beyond the normal range of illumination to light up an instrument, gage, number plate or other indicia, not within the range of illumination of the lamp.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A construction wherein one or more indicators are mounted upon the cowl board of a motor vehicle outside the normal field of illumination of a source of illumination, likewise mounted upon the cowl board, characterized by a miniature reflector adjustably mounted upon the cowl board in position to intercept rays of light from the source of illumination and redirect them onto one of said indicators, and a universal mounting for the reflector by which it may be adjusted to illuminate the face of a desired indicator without causing glare objectionable to an observer within the vehicle.

2. A construction wherein one or more indicators are mounted upon the cowl board of a motor vehicle outside the normal field of illumination, of a source of illumination, likewise mounted upon the cowl board, characterized by a miniature reflector mounted in proximity to the indicator and distantly removed from the source of illumination for redirecting light from the distant source upon the face of the indicator by which the rays of reflected light are directed in such relation with the line of observation as to avoid glare.

In testimony whereof, I have hereunto set my hand this 11th day of September A. D. 1920.

CLIFFORD M. COLE.

Witnesses:
L. E. COLE,
PARK DENSMORE.